July 11, 1967     J. H. PAUL ET AL     3,330,001

METHOD AND APPARATUS FOR FORMING CORNER PADS

Filed Dec. 20, 1963     4 Sheets-Sheet 1

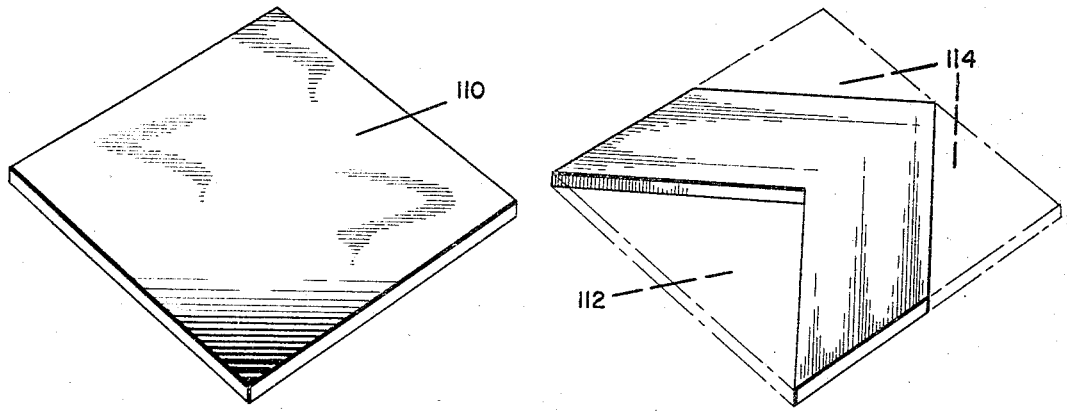

STAGE 1    Cutting Leading & Trailing Portions of Stock

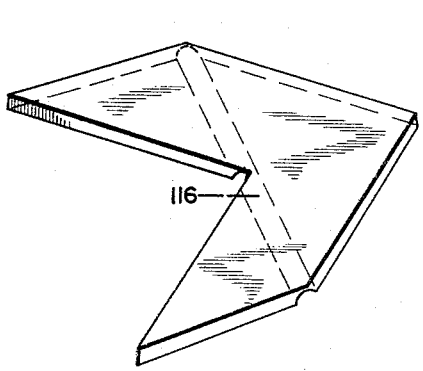

STAGE 2    Forming Transverse Groove

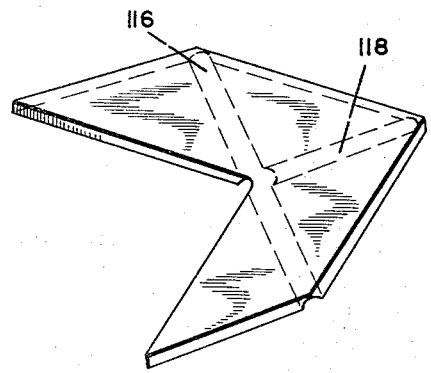

STAGE 3    Forming Axial Groove

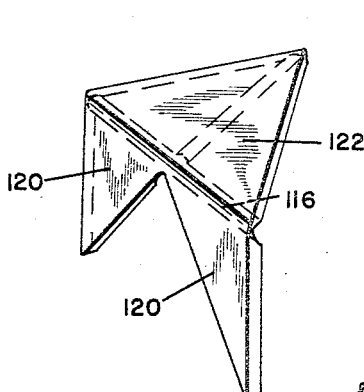

STAGE 4    Folding Leading Portions Downwardly Along Transverse

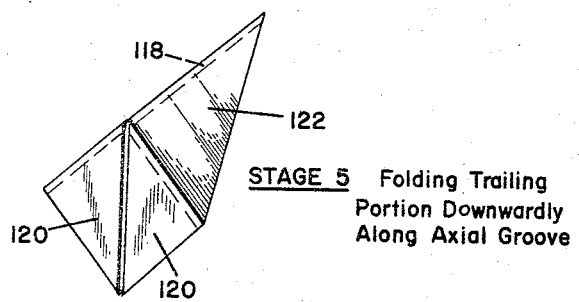

STAGE 5    Folding Trailing Portion Downwardly Along Axial Groove

FIG. 1

INVENTORS
JAMES H. PAUL
JAMES C. DICKINSON, JR.
RICHARD L. SORRELL

BY Semmes and Semmes

ATTORNEYS

INVENTORS
JAMES H. PAUL
JAMES C. DICKINSON, JR.
RICHARD L. SORRELL

BY *Semmes and Semmes*

ATTORNEYS

United States Patent Office 3,330,001
Patented July 11, 1967

3,330,001
METHOD AND APPARATUS FOR FORMING CORNER PADS
James H. Paul, Decatur, James C. Dickinson, Jr., Atlanta, and Richard L. Sorrell, Stone Mountain, Ga., assignors to Three J Enterprises, Inc., Decatur, Ga., a corporation of Georgia
Filed Dec. 20, 1963, Ser. No. 332,150
3 Claims. (Cl. 18—19)

The present application relates to a method for forming corner pads used to protect the edges of furniture during shipment, and, in particular to a method and suggested apparatus for forming such pads from plastics without the use of die and blow molding processes.

The packaging industry has been supplying corner pads and interior packaging made from corrugated board for many years in an attempt to prevent the corners and edges of furniture from being marred or scratched during shipment. With the advent of expanded polystyrene and polyurethane foam sheets the industry immediately recognized the possibility of making corner pads and interior packaging from these materials. To date, only the methods of die molding and blow molding have been proposed for utilizing these materials in the manufacture of such corner pads. Such expensive methods of production have resulted in much investigation as to other more economical processes for utilizing polystyrene and polyurethane foam sheets as packaging materials.

The present invention provides the advantages of fast and efficient production with the accompanying result of low per unit cost, thus making the polystyrene and polyurethane corner pads competitive with similar packaging equipment produced by the corrugated board industry. The suggested machine is inexpensive to manufacture and extremely mobile, thus providing the advantage of being capable of being set up at the plant or industry. The method of operation includes the steps of:

(1) Advancing a blank piece of expanded plastic stock;
(2) Separating the leading and trailing portions of the stock with the use of hot wire cutting elements;
(3) Forming a transverse groove intermediate the forward and rear portions of the stock with the use of hot coiled wire elements;
(4) Forming an axial groove intermediate the side portions of the stock with the use of a similar hot coiled grooving element;
(5) Folding the forward portion of the stock at a right angle to the rearward portion thereof with the use of a forming block; and
(6) Folding the sides of the rearward portion of the stock downwardly around the axial groove with the use of a similar forming block.

The suggested apparatus for performing the above operation employs the use of a hot wire cutting and grooving assembly as well as a folding and bonding assembly.

Accordingly, it is an object of the present invention to provide a method of forming corner pads from expanded plastics without using molding processes.

Another object of the invention is to provide a method of forming corner pads from polystyrene and polyurethane in which the material is subjected to hot wire cutting and grooving and heat forming processes.

Yet additional objects of the invention will become apparent from the ensuing specification and attached drawings which illustrate the suggested device for performing the present method and wherein:

FIG. 1 is a schematic illustration of the various stages included in the method of forming the corner pads.

Figure 2:
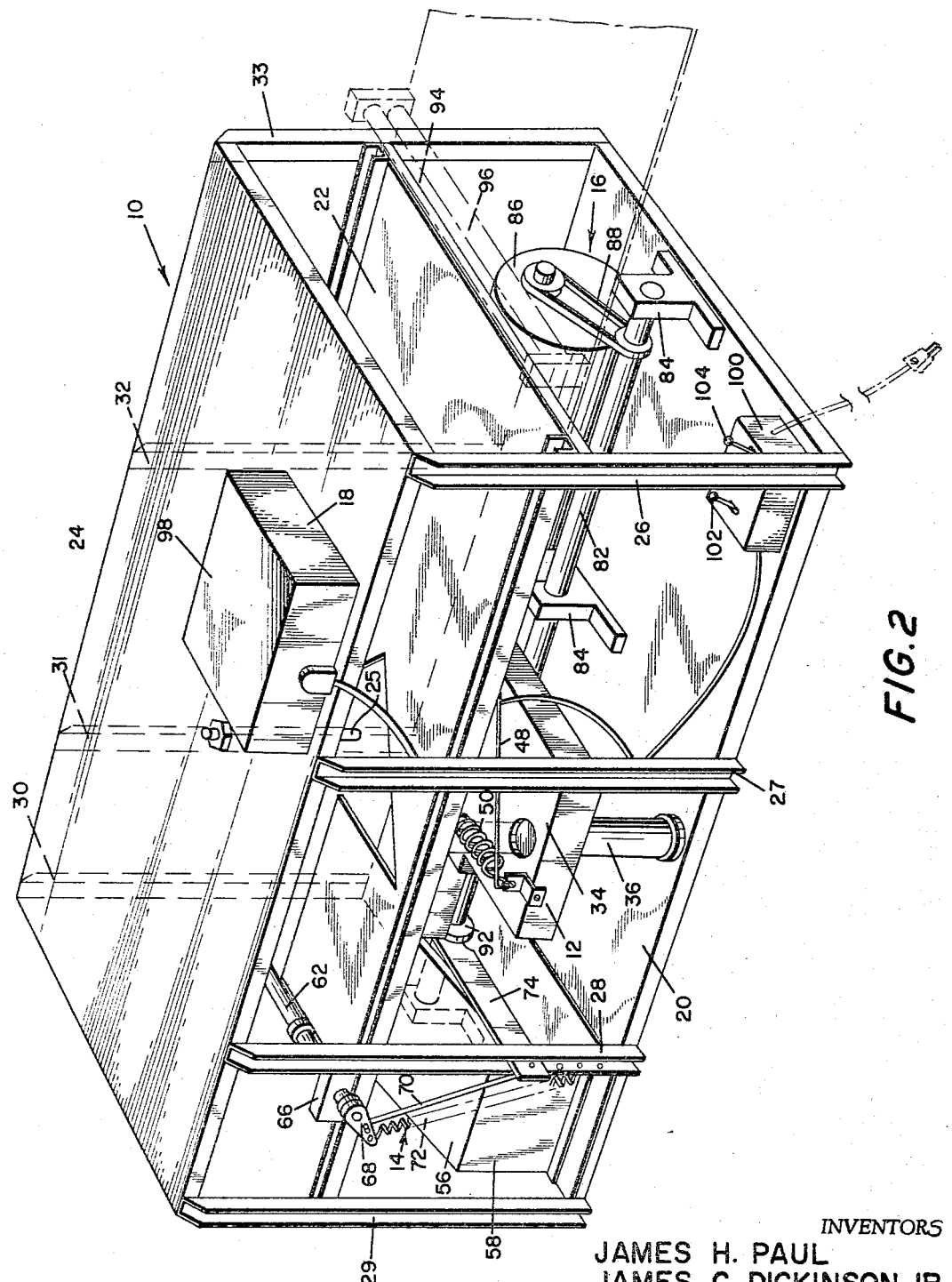
FIG. 2 is a perspective view of the corner pads manufacturing device illustrating all of the basic component parts.

The suggested apparatus for forming three-surfaced corner pads consists of a frame 10, a cutting and grooving assembly 12, a folding and bonding assembly 14, a driving assembly 16, and a control system 18.

Frame 10 consists of a bottom platform 20, an intermediate feeding platform 22 having an "arrow" shaped opening therein, and a top platform 24, all of which are supported in spaced relation by vertical supports 26, 27, 28, 29, 30, 31, 32 and 33 as shown in FIG. 2. Vertical supports 26 through 33 are channel-shaped members and attached to platforms 20, 22 and 24 by bolts. Mounted in spaced relation above feeding platform 22 are guides 25 which hold the blank stock in place during the cutting and grooving operations and resist the tendency of the stock to be pushed upward by the operation of cutting and grooving assembly.

Figure 4:
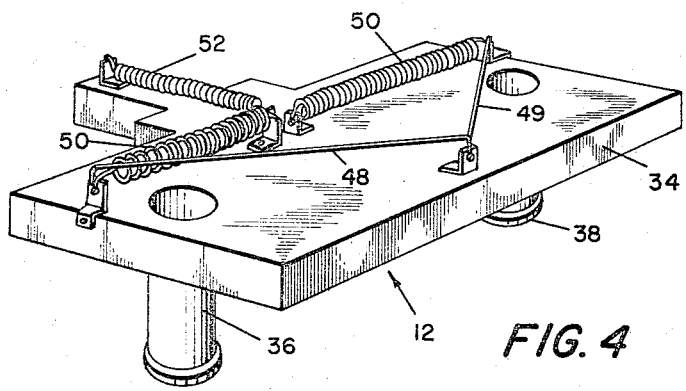
FIG. 4 is a perspective view of the cutting and grooving assembly.

The cutting and grooving assembly 12 consists of a mounting platform 34 having hollow legs 36 and 38 attached to the bottom thereof. Also attached to the bottom of mounting platform 34 is a block 40 with a bearing 42 attached thereto, said block and bearing assembly resting in engageable contact with cam 90 which will be described later. Hollow legs 36 and 38 enclose identical posts 44, which are attached to bottom platform 20, in sliding relationship so as to allow mounting platform 34 to move vertically upward as cam 90 exerts a force on bearing 42. On the top of mounting platform 34 are located two cutting wires 48 and 49, a transverse wire coil 50 and an axial coil 52, all of which are connected in series, as seen in FIG. 4.

Figure 3:
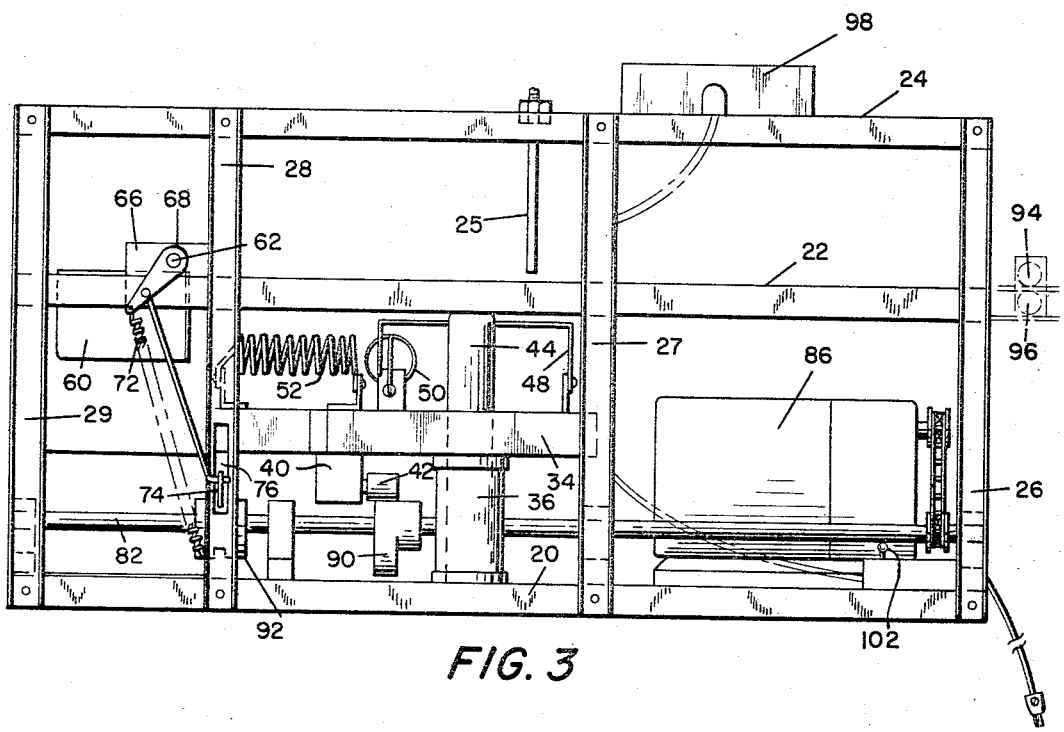
FIG. 3 is a side elevation of the device showing the relationship of the driving assembly to the cutting, grooving and folding assemblies.
Figure 5:
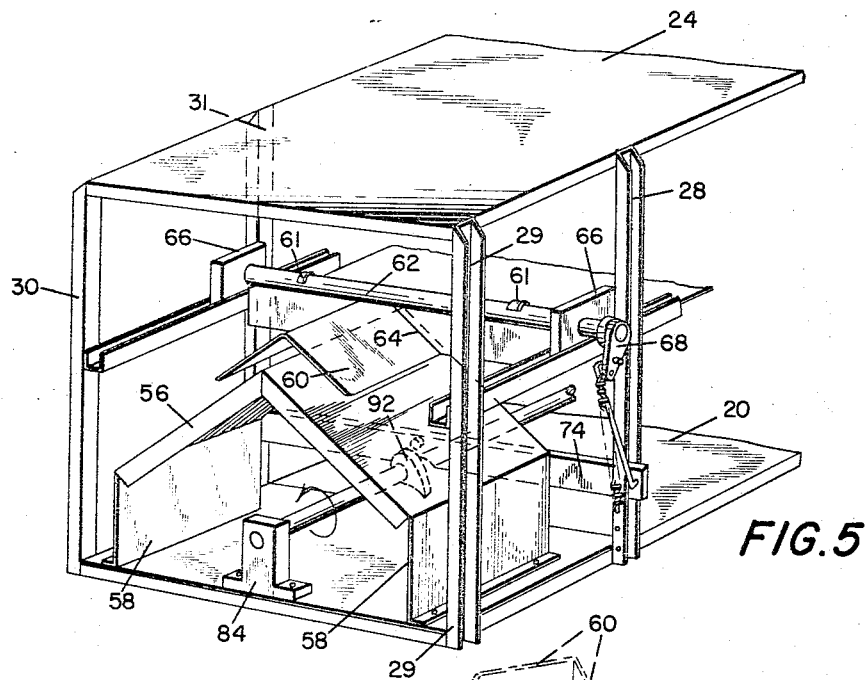
FIG. 5 is a perspective view of that end of the device containing the folding assembly.
Figure 6:
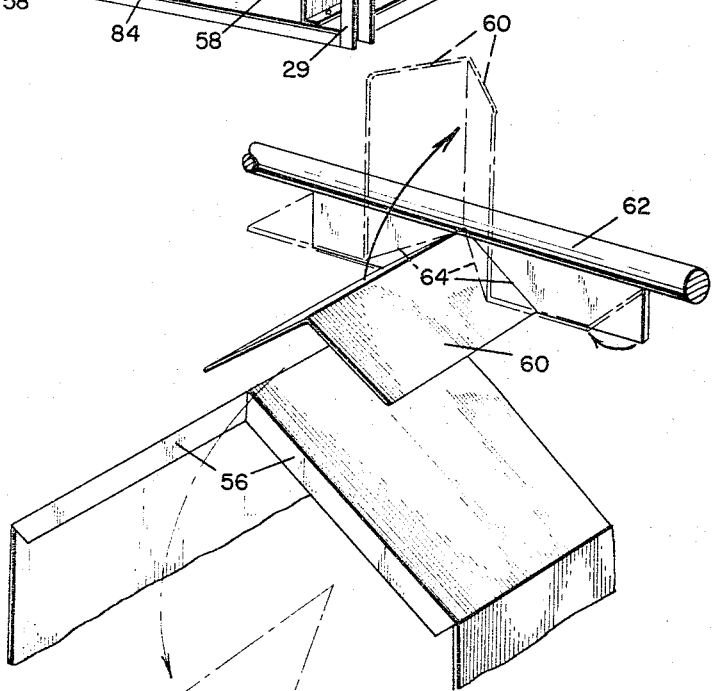
FIG. 6 is a perspective view showing the operation of the folding assembly.

The folding and bonding assembly 14 consists of a mandrel having two top portions 56 which intersect to form an inverted V and two vertical bottom portions 58 which are attached to bottom platform 20. A folding flap 60 consisting of two flat portions which are configured complementary to the top portions 56 of the mandrel, is welded to a pivotable rod 62 at joint 64. Attached to each end of pivotable rod 62 are bearing blocks 66 which are mounted on feeding platform 22. Rod 62 has an arm 68 welded at one thereof to which are attached rod 70 and spring member 72. As seen in FIGS. 3 and 5, a transverse bar 74 is mounted in slidable relation within identical slots 76 of vertical supports 28 and 31 and has a small arc portion removed from the bottom edge thereof, the surface of which rests in contact with cam 92. The bottom portion of rod 70 is attached to one end of transverse bar 74 as shown in FIG. 1 and the corresponding lower end of spring member 72 is attached to vertical support 28. Thus, as cam 92 rotates, the transverse bar 74 is moved vertically upward causing rod 70 to turn pivotable rod 62 as the resistance of spring member 72 is overcome, which action in turn rotates folding flap 60. Stop members 61 prevent rod 62 from rotating past that position where flap 60 is vertically positioned as seen in FIG. 6.

The driving assembly 16 consists of a driveshaft 82 supported at each end of the frame by supports 84 and powered by motor 86 which is connected in driving relation to driveshaft 82 by chain drive 88. Below the mounting platform 34 of the cutting and grooving assembly 12 is located a first cam 90, the shape of which is shown in FIGS. 3 and 5. Below the transverse bar 74 of the folding and bonding assembly 14 is located a second cam 92 which shape is also shown in FIG. 3. At the right end of intermediate feeding platform 22 as seen in FIGS. 1 and 3, are located driving wheels 94 and 96 which are used to introduce the blank stock to the feeding platform 22.

The control system 18 for actuating and controlling the operation of the cutting, grooving, folding and bonding operations consists of a rheostat 98 mounted on top platform 24 for regulating the current to wires 48, transverse coil 50 and axial coil 52, thus controlling the temperature of the cutting and the grooving operations. On bottom platform 20 is located a switch assembly 100 containing a first switch 102 which is used to actuate motor 86 and a second switch 104 which is used to actuate the driving wheels 94 and 96.

The operation of the suggested apparatus for forming corner pads is as follows: The rheostat 98 is turned on causing the wires 48 and coils 50 and 52 of the cutting and grooving assembly 12 to be heated to the desired temperature. Then, switches 102 and 104 are turned on actuating the driving assembly 16 and the driving wheels 94 and 96 causing blank stock 110 to move along the feeding platform 22. As the leading portion 112 of stock 110 reaches that part of feeding platform 22 which is located directly above wires 48 and 49, cam 90 causes mounting platform 34 to move upwardly, thus bringing the heated wires 48 and 49 into contact with blank stock 110. The heated wires 48 and 49 then cut away a section 112 of the leading portion of the advancing blank stock 110. Similarly, cam 90 again actuates mounting platform 34 causing sections 114 to be removed from the trailing portion of the advancing blank stock 110. This cutting operation is illustrated by Stage 1 of FIG. 2. As the sections 114 are removed from the trailing portion of the blank stock 110, the longitudinal coil 50 is also raised into position, thus forming a transverse groove 116 in the underside of the stock as seen in Stage 2 of FIG. 2. As the stock 110 continues to move down the feeding platform 22, the mounting platform 34 is again actuated by cam 90, thus causing axial coil 52 to be raised into position to form an axial groove 118 in the underside of stock 110 as illustrated by Stage 3 of FIG. 2. In Stage 4 of the operation, the remaining leading portions 120 of stock 110 are folded downwardly at right angles to the trailing portion of the stock by the force of folding flap 60 as it contacts the remaining leading portions 120 of stock 110. The folding flap 60 is caused to rotate by the actuation of transverse bar 74 by cam 92 as previously described above. In Stage 5 of the operation, folding flap 60 is rotated downwardly once the trailing portion of the stock has advanced to a position directly above the top portions 56 of the mandrel. As seen in Stage 5 of FIG. 2, the force of folding flap 60 causes the remaining trailing portion 122 of stock 110 to be folded downwardly along the axial groove 118, thus completing the three-surfaced corner pad.

Manifestly, various modifications of the method of manufacture and its suggested apparatus may be employed without departing from the scope of invention, as defined in the subjoined claims.

We claim:

1. An apparatus for manufacturing three-surfaced corner pads comprising:
    (a) a frame assembly including a feeding platform and a drive means for advancing plastic stock thereon, said feeding platform containing an opening therein;
    (b) a cutting and grooving device positioned beneath said feeding platform and arranged to reciprocate vertically through said opening in said feeding platform and into said stock, said cutting and grooving device consisting of
        (i) at least one cutting wire configured to the pattern desired,
        (ii) a transverse coil of wire having its ends connected to the free ends of said cutting wire, and
        (iii) an axial coil of wire attached to said transverse coil and lying on the opposite side of said transverse coil from said cutting wire and perpendicular to said transverse coil;
    (c) a mandrel positioned at the discharge end of said feeding platform;
    (d) a folding flap device configured complementary with respect to said mandrel and pivoted on said frame;
    (e) a driveshaft supported on said frame assembly beneath said platform; and
    (f) cam means attached to said driveshaft and operatively connected to said cutting and grooving device and said folding flap, sequentially contacting said device and said flap upon rotation of said drive shaft.

2. An apparatus for manufacturing three-surfaced pads as in claim 1, said mandrel consisting of a top portion in the shape of an inverted V supported upon two vertical base portions attached to said frame assembly.

3. Apparatus as in claim 2, including rheostat control means attached to said cutting wire and said coils.

References Cited

UNITED STATES PATENTS

| | | | |
|---|---|---|---|
| 1,913,055 | 6/1933 | Keller | 18—19 X |
| 2,431,353 | 11/1947 | Varner et al. | 18—19 |
| 2,589,022 | 3/1952 | Page et al. | 18—19 X |
| 2,639,649 | 5/1953 | Silby | 93—58.3 X |
| 2,811,086 | 10/1957 | Hollis | 93—58.3 X |
| 2,851,933 | 9/1958 | Bradford et al. | 93—58.3 |

WILLIAM J. STEPHENSON, *Primary Examiner.*